United States Patent
Hashimoto et al.

(10) Patent No.: US 8,356,633 B2
(45) Date of Patent: Jan. 22, 2013

(54) STACKED CONDUIT ASSEMBLY AND SCREW FASTENING METHOD FOR CONDUIT PART

(75) Inventors: Minoru Hashimoto, Tokyo (JP); Masashi Hanyu, Kanagawa (JP)

(73) Assignee: Mitsubishi Electric Corporation, Tokyo (JP)

( * ) Notice: Subject to any disclaimer, the term of this patent is extended or adjusted under 35 U.S.C. 154(b) by 260 days.

(21) Appl. No.: 12/867,255

(22) PCT Filed: Feb. 24, 2009

(86) PCT No.: PCT/JP2009/053273
§ 371 (c)(1),
(2), (4) Date: Aug. 12, 2010

(87) PCT Pub. No.: WO2009/119225
PCT Pub. Date: Oct. 1, 2009

(65) Prior Publication Data
US 2011/0000570 A1    Jan. 6, 2011

(30) Foreign Application Priority Data
Mar. 25, 2008  (JP) .................................. 2008-079021

(51) Int. Cl.
*F16L 3/00* (2006.01)
(52) U.S. Cl. ....................... 138/42; 137/625.27; 251/127
(58) Field of Classification Search .................. 138/42, 138/43; 137/625.3, 625.27; 251/127
See application file for complete search history.

(56) References Cited

U.S. PATENT DOCUMENTS

| | | | | |
|---|---|---|---|---|
| 3,856,049 A | * | 12/1974 | Scull | ................................. 138/42 |
| 5,819,803 A | * | 10/1998 | Lebo et al. | ........................ 138/42 |
| 5,908,664 A | | 6/1999 | Nagayama | |
| 6,394,134 B1 | * | 5/2002 | Kwon | .......................... 137/625.3 |
| 7,044,437 B1 | * | 5/2006 | Martin | ........................... 251/127 |
| 7,431,045 B2 | * | 10/2008 | Mudd et al. | ................. 137/487.5 |

FOREIGN PATENT DOCUMENTS

| | | |
|---|---|---|
| JP | 10 296375 | 11/1998 |
| JP | 2002 84208 | 3/2002 |
| JP | 2003 87009 | 3/2003 |
| JP | 2005 23944 | 1/2005 |
| JP | 2005-209727 | 8/2005 |

* cited by examiner

*Primary Examiner* — Patrick F Brinson
(74) *Attorney, Agent, or Firm* — Oblon, Spivak, McClelland, Maier & Neustadt, L.L.P.

(57) ABSTRACT

A stacked conduit assembly includes: a conduit part in which a plurality of plate-like parts are stacked and integrated, and a hollow conduit is formed in an inner layer; and a control board to be fastened to the conduit part by a screw. The plate-like parts include a plurality of plate-like parts that respectively form a side wall, an upper face, and a bottom face of the conduit, a pilot hole is formed in a plate-like part that forms the side wall of the conduit, and the screw is a tapping screw that taps by itself in the pilot hole and is fastened. Thus, a stacked conduit assembly that can stabilize a screw engagement state and realize downsizing or thinning of devices and cost reduction can be obtained.

7 Claims, 3 Drawing Sheets

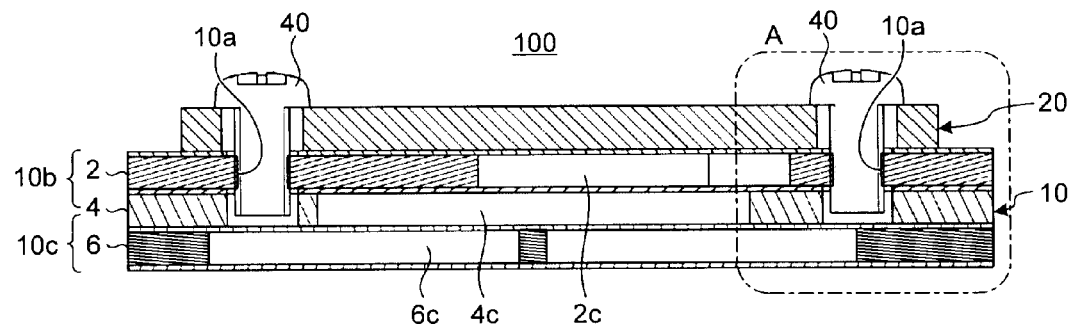
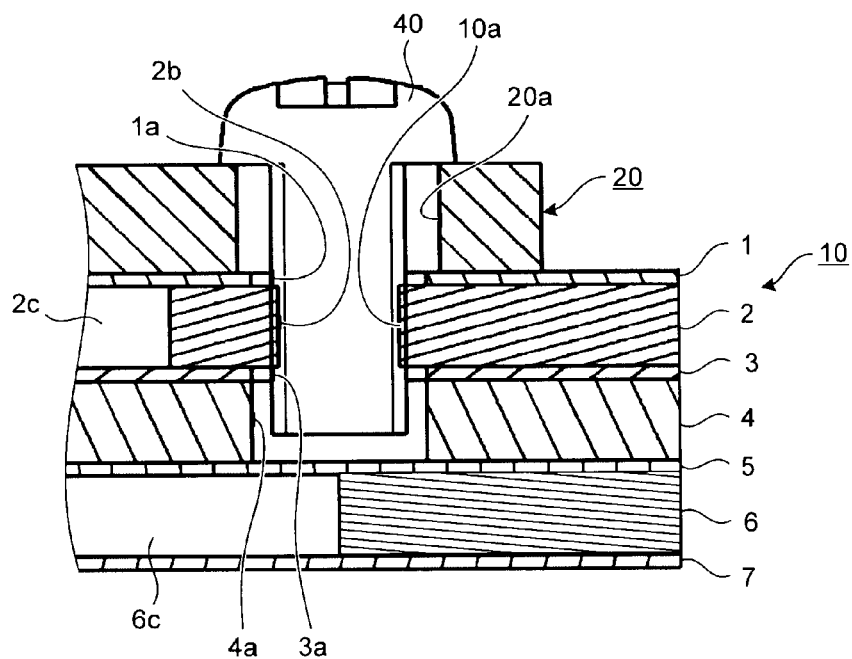

STACKED CONDUIT ASSEMBLY AND SCREW FASTENING METHOD FOR CONDUIT PART

TECHNICAL FIELD

The present invention relates to a stacked conduit assembly formed by stacking and integrating a plurality of plate-like parts, and fastening a fastening target part such as a control board to a conduit part in which a hollow conduit is formed in an inner layer. The present invention also relates to a screw fastening method for a conduit part for fastening a fastening target part to the conduit part by a screw.

BACKGROUND ART

In waveguide parts used in microwave or millimeter-wave radars and communication devices and antennas having a waveguide structure, a configuration such that complicated hollow conduits are stacked has been desired. Particularly, in a case of consumer products such as an in-vehicle radar, downsizing and high productivity are required. Therefore, as a mode of a conduit part having a hollow waveguide (a conduit) formed therein, a complicated conduit structure can be realized by staking a plurality of plate-like parts having core holes in various shapes formed therein and integrating these parts by surface bonding or the like, and a configuration in which a fastening target part such as a control board is fastened to the conduit part by a screw is used.

As for a method for fastening a screw to the conduit part, there can be considered a method in which a screw hole is formed by machining after conduit parts are integrated, and a method in which conduit parts are integrated after a screw hole is drilled in one conduit part beforehand.

Meanwhile, as a method for fastening a screw to stacked thin plates, for example, a method described in Patent Document 1 has been proposed conventionally. In this proposed method, a dish-shaped reduced part having a fastening hole for a tapping screw is formed on one thin plate, and a supporting unit that supports the dish-shaped reduced part from inside is provided on the other thin plate. The thickness of a fastening part is substantially increased by the dish-shaped reduced part and the supporting unit, and an axial force generated by a fastening torque is supported from inside of the dish-shaped reduced part by the supporting unit to prevent the dish-shaped reduced part from being buckled.

Patent Document 1: Japanese Patent Application Laid-open No. 2005-23944.

DISCLOSURE OF INVENTION

Problem to be Solved by the Invention

However, in the method in which a screw hole is formed by machining after conduit parts are integrated, a cutting oil used at the time of drilling the screw hole and a cleaning solution for removing the cutting oil flow into conduits of the parts and cannot be removed. In the case of a small device, a clearance area at an end of a drill in pilot hole drilling needs to be considered with respect to an arrangement in which a position of a screw hole and a conduit position in an inner layer are overlapped on each other. These factors cause problems in thinning of devices.

As for the method in which conduit parts are integrated after a screw hole is drilled in one conduit part beforehand, a configuration in which parts shape can be most simplified at the time of division is a mode in which parts of a side wall, an upper face, and a bottom face of the conduit are divided from each other. However, in this case, the thickness of each part is limited to the height of the conduit or less, thereby causing a problem in that it is difficult to obtain a required thread engagement length (generally, three pitches or more of a thread are required).

In connection therewith, according to the method described in Patent Document 1, when a dish-shaped reduced part is formed, its manufacturing cost increases as the number of machining processes increases, and the formation of the dish-shaped reduced part has an adverse effect in thinning, and thus this method is not an effective improvement method. In this respect, there has been desired a proposal for enabling stable screw fastening by a simple method with respect to conduit parts in which thin-plate parts are stacked.

The present invention has been achieved in order to solve the above problems, and an object of the present invention is to provide a stacked conduit assembly and a screw fastening method for a conduit part, which can stabilize a screw engagement state, decrease a thread length and a screw hole depth to a necessity minimum, realize downsizing (thinning) of devices, and achieve cost reduction by not requiring screw hole drilling, in a structure in which a fastening target part is fastened by a screw to a conduit part in which thin-plate parts are stacked and integrated.

Means for Solving Problem

In order to solve the above problem, and in order to attain the above object, a stacked conduit assembly of the present invention includes a conduit part in which a plurality of plate-like parts are stacked and integrated, and a hollow conduit is formed in an inner layer; and a fastening target part that is fastened to the conduit part by a screw. The plate-like parts includes a plurality of plate-like parts that respectively form a side wall, an upper face, and a bottom face of the conduit. A pilot hole of the screw is formed in at least one first plate-like part that forms the side wall of the conduit. The screw is a tapping screw that taps by itself in the pilot hole and is fastened.

In a screw fastening method for a conduit part for fastening a fastening target part to a conduit part in which a plurality of plate-like parts are stacked and integrated, and a hollow conduit is formed in an inner layer, the screw fastening method of the present invention includes a stacking step of stacking and integrating a plurality of plate-like parts including at least one first plate-like part in which a core hole, which becomes the conduit, and a pilot hole are formed, thereby manufacturing the conduit part; and a fastening step of fastening the fastening target part to the conduit part by self-tapping of the tapping screw in the pilot hole in the conduit part and screwing the tapping screw therein.

Effect of the Invention

According to the present invention, in a structure in which a fastening target part is fastened by a screw to a conduit part in which thin-plate parts are stacked and integrated, the screw engagement state can be stabilized, the thread length and the screw hole depth can be decreased to a necessity minimum, and downsizing (thinning) of devices can be realized, and cost reduction can be achieved by not requiring screw hole drilling.

BRIEF DESCRIPTION OF DRAWINGS

FIG. 4 is a lateral cross-sectional view of a stacked conduit assembly.

FIG. 5 is a partial enlarged view of a fastening part of a tapping screw in FIG. 4 in an enlarged manner.

Figure 1:
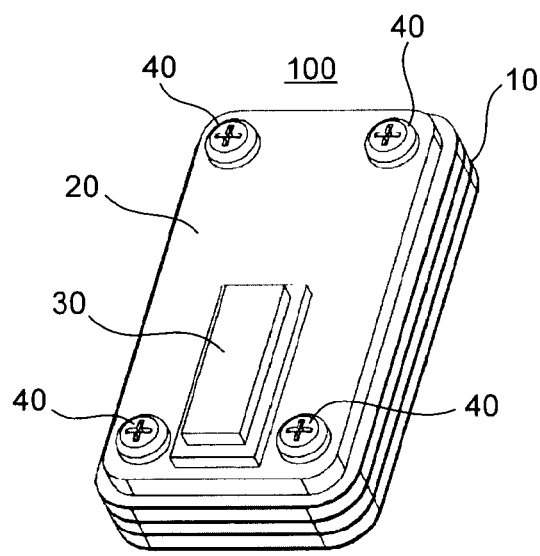
FIG. 1 is a perspective view of a stacked conduit assembly according to a first embodiment of the present invention.

EXPLANATIONS OF LETTERS OR NUMERALS 1 to 7 plate-like part
1a, 3a, 4a clearance hole
1c, 3c, 5c, 7c slit-like pinhole
2b, 10a pilot hole
2c, 4c, 6c core hole that becomes conduit (waveguide)
10 waveguide conduit part (conduit part)
20 control board (fastening target part)
30 high frequency device
40 tapping screw
100 stacked conduit assembly

BEST MODE(S) FOR CARRYING OUT THE INVENTION

Exemplary embodiments of a stacked conduit assembly and a screw fastening method for a conduit part according to the present invention will be explained below in detail with reference to the accompanying drawings. The present invention is not limited to the embodiments.

First Embodiment.

Figure 2:
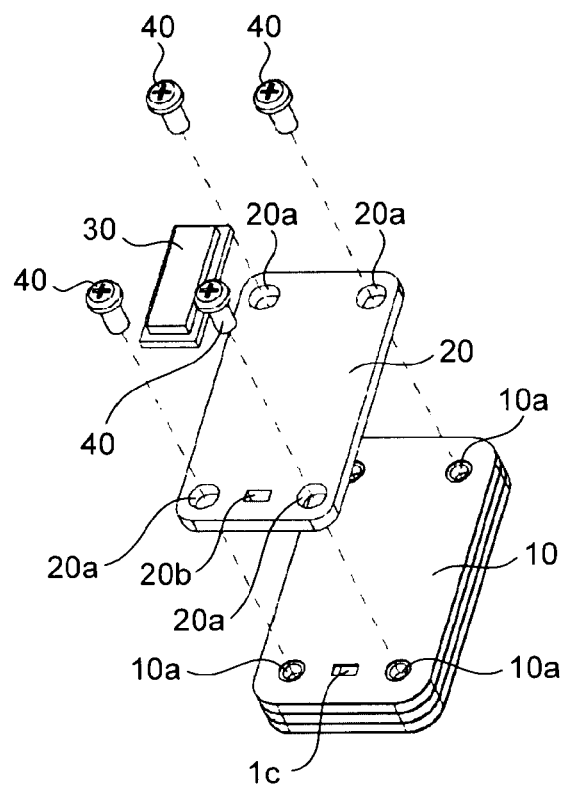
FIG. 2 is an exploded perspective view of the stacked conduit assembly in FIG. 1.

FIG. 1 is a perspective view of a stacked conduit assembly according to a first embodiment of the present invention. FIG. 2 is an exploded perspective view of the stacked conduit assembly in FIG. 1. A stacked conduit assembly 100 includes a waveguide conduit part (a conduit part) 10, a control board 20 as a fastening target part, which is fastened to the waveguide conduit part 10 by tapping screws 40, and a high frequency device 30 mounted on the control board 20. The high frequency device 30 includes a transmitting and receiving function with microwave or millimeter-wave. In the waveguide conduit part 10, a plurality of plate-like parts are stacked and integrated by surface bonding. A hollow conduit (a waveguide) (not shown) is formed in an inner layer of the waveguide conduit part 10. A pilot hole 10a is formed in the waveguide conduit part 10. Meanwhile, a through hole 20a is formed in the control board 20, and the tapping screw 40 that penetrates through the through hole 20a is screwed into the pilot hole 10a of the waveguide conduit part 10, thereby fastening the control board 20 to the waveguide conduit part 10.

Figure 3:
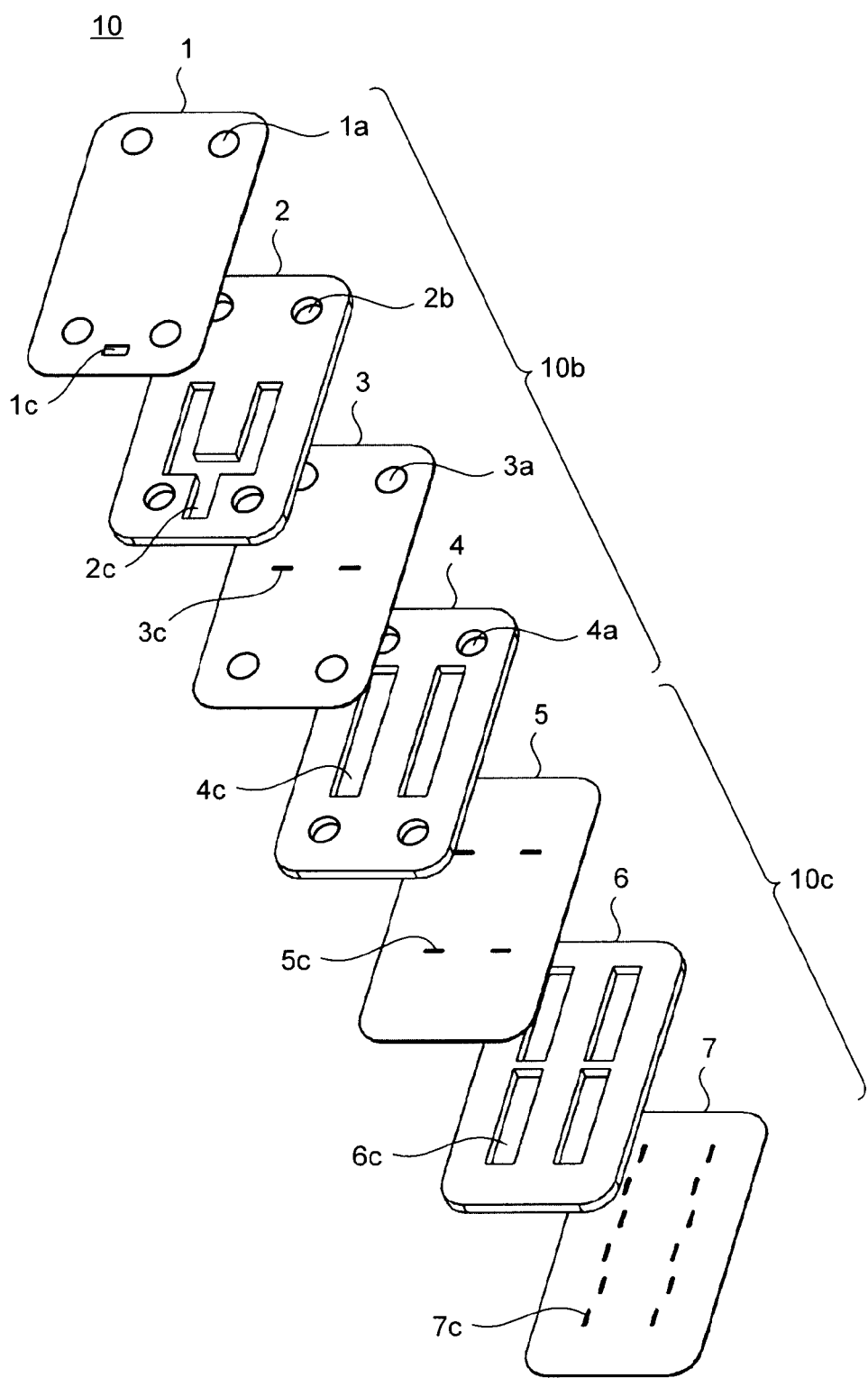
FIG. 3 is an exploded perspective view of a waveguide conduit part.

FIG. 3 is an exploded perspective view of the waveguide conduit part 10. FIG. 4 is a lateral cross-sectional view of the stacked conduit assembly 100. FIG. 5 is a partial enlarged view of a part A near a fastening part of the tapping screw 40 in FIG. 4 in an enlarged manner. In FIG. 3, in the waveguide conduit part 10, thin plate-like parts 1, 3, 5, and 7 and thick plate-like parts 2, 4, and 6 are alternatively stacked on each other by being pasted by an adhesive or the like and integrated. Large-area core holes 2c, 4c, and 6c having various shapes for forming a waveguide are opened in the thick plate-like parts 2, 4, and 6. Meanwhile, slit-like pinholes 1c, 3c, 5c, and 7c communicating with the core holes 2c, 4c, and 6c are formed in the thin plate-like parts 1, 3, 5, and 7. In this manner, core holes having various shapes for forming the waveguide are provided beforehand in the plate-like parts and these plate-like parts are stacked and integrated, thereby enabling to obtain a complicated waveguide. The control board 20 includes a waveguide hole 20b for coupling the waveguide formed in this manner with the high frequency device 30 formed therein (FIG. 2). The high frequency device 30 performs microwave or millimeter-wave transmission and reception via the waveguide.

In the present embodiment, a pilot hole 2b is formed only in the second plate-like part (the first plate-like part) 2 from the control board 20 side of the waveguide conduit part 10. Clearance holes 1a, 3a, and 4a are respectively formed at positions corresponding to the pilot hole 2b in the first, third, and fourth plate-like parts (the second plate-like part) 1, 3, 4 putting the plate-like part 2 therebetween in a stacking direction.

That is, in the stacked conduit assembly 100 according to the present embodiment, the waveguide conduit part 10 is manufactured by stacking the plate-like part 2 in which the core hole 2c, which becomes a side wall of a conduit (a waveguide), and the pilot hole 2b are formed, and the plate-like parts 1, 3, and 4 that put the plate-like part 2 therebetween in the stacking direction and include the clearance holes 1a, 3a, and 4a formed therein at the position overlapping on the pilot hole 2b (a stacking process), and thereafter the tapping screw 40 that taps by itself is screwed into the pilot hole 2b (10a) of the waveguide conduit part 10 to fasten the control board 20 to the waveguide conduit part 10 (a fastening process).

The height of the conduit to be formed (the thickness of the plate-like parts 2, 4, and 6 having the core holes 2c, 4c, and 6c formed therein) are relevant to a frequency band to be used. When the frequency band is millimeter-wave 76-GHz band, the height of the conduit is about 1 to 1.3 millimeters and the part height corresponds to a thread engagement length. Therefore, a generally used M3 coarse thread (having a pitch of 0.5 millimeter) is shorter than three pitches corresponding to the thread engagement length, and the screw fastening state is hardly stabilized. However, in the configuration in which the stacked conduit assembly 100 is fastened by the tapping screws 40 used in the present embodiment, because adhesion with an internal screw thread (the pilot hole 2b) is high, the screw fastening state can be stabilized even with the engagement length of about two pitches, thereby enabling to realize screw fastening of the control board 20 to the waveguide conduit part 10 formed by stacking thin plates.

As described above, according to the stacked conduit assembly having such a configuration, the engagement length of the tapping screw 40 can be controlled by the thickness of the plate-like part 2, and the depth of the screw hole can be adjusted by the number of plate-like parts 1, 3, and 4 forming the clearance holes. Therefore, a minimum depth can be easily selected according to the length of the tapping screw 40 and downsizing (thinning) of devices can be realized.

Further, according to a screw fastening method for the conduit part having such a configuration, a clearance area at an end of a drill in pilot hole drilling does not need to be considered, and thus downsizing (thinning) of devices can be realized. That is, a core hole forming a waveguide and a screw hole are formed in a stacked body 10b that constitutes the control board 20 side of the waveguide conduit part 10. However, a clearance area at the end of a drill does not need to be considered in a stacked body 10c that constitutes other parts of the waveguide conduit part 10, and the core hole can be formed in a wide range, thereby enabling effective use of a volume and downsizing of devices.

In the present embodiment, in a structure for fastening a fastening target part to a conduit part formed by stacking and integrating thin-plate parts by screws, the thread engagement state can be stabilized and the length of the screw and the depth of the screw hole can be made necessity minimum, thereby enabling to realize downsizing (thinning) of devices and to achieve cost reduction by not requiring screw hole drilling.

In the present embodiment, the waveguide hole 20b is provided in the control board 20 for space propagation of a radio wave between the high frequency device 30 and the waveguide conduit part 10; however, the same function can be realized by a configuration in which a dielectric waveguide (a pattern or the like) is provided in the control board 20.

Second Embodiment.

The structure of a stacked conduit assembly according to the present embodiment is the same as that of the first embodiment. When the material of the waveguide conduit part 10 is stainless steel, because the degree of hardness is high (equal to or higher than 250 Hv in Vickers hardness), generally, a tapping screw cannot fasten the waveguide conduit part 10 (an approximate standard of the material hardness that can be fastened by a general tapping screw is less than 50% of a screw hardness, which is about 20 Hv or less).

In the present embodiment, therefore, an annealing process at about 800° C. is performed to the entire waveguide conduit part 10 or the plate-like part 2 in which the pilot hole 2b is formed (a heat treatment process). By this process, the hardness is decreased to 220 Hv or less, thereby realizing a structure in which screw fastening can be performed with respect to a stainless-steel component.

In the heat treatment process mentioned above, when a bonding method with high-temperature heating, which is represented by diffusion bonding, is adopted for the bonding method for integration, the heat treatment process can be performed simultaneously with bonding, thereby enabling easy handling.

Industrial Applicability

The stacked conduit assembly according to the present invention is suitable for application to waveguide parts used in microwave or millimeter-wave radars and communication devices and antennas having a waveguide structure.

The invention claimed is:

1. A stacked conduit assembly comprising:
a conduit part in which a plurality of plate-like parts are stacked and integrated, and a hollow conduit is formed in an inner layer; and
a fastening target part that is fastened to the conduit part by a tapping screw that taps by itself in a pilot hole and is fastened, wherein
the plate-like parts comprise a plurality of plate-like parts that respectively form a side wall, an upper face, and a bottom face of the conduit, and
the pilot hole of the tapping screw is formed in a first plate-like part that forms a side wall of the conduit, the relative position of the first plate-like part within the stack of plate-like parts corresponding to a length of the tapping screw.

2. The stacked conduit assembly according to claim 1, wherein the plate-like parts further comprise a second plate-like part stacked on the first plate-like part and having a clearance hole formed therein, which becomes a space for clearing an end of the tapping screw.

3. The stacked conduit assembly according to claim 1, wherein the entirety of conduit part or the first plate-like part is annealed.

4. The stacked conduit assembly according to claim 3, wherein a material of the first plate-like part is stainless steel or a high hardness material composed mainly of stainless steel.

5. A manufacturing method of a stacked conduit assembly, wherein the assembly comprises:
a conduit part in which a plurality of plate-like parts are stacked and integrated, and a hollow conduit is formed in an inner layer; and
a fastening target part that is fastened to the conduit part by a tapping screw that taps by itself in a pilot hole and is fastened,
the plate-like parts comprises a plurality of plate-like parts that respectively form a side wall, an upper face, and a bottom face of the conduit, and
the method comprises:
a stacking step of stacking and integrating a plurality of plate-like parts in a first one of which a core hole, which becomes the conduit, is formed and the pilot hole of the tapping screw is formed, the relative position of the one of the plate-like parts within the stack of plate-like parts corresponding to a length of the tapping screw, thereby manufacturing the conduit part; and
a fastening step of fastening the fastening target part to the conduit part by self-tapping of the tapping screw in the pilot hole in the conduit part and screwing the tapping screw therein.

6. The manufacturing method of a stacked conduit assembly according to claim 5, wherein the stacking step comprises a step of stacking on the first plate-like part a second plate-like part having a clearance hole formed therein at a position overlapping on the pilot hole.

7. The manufacturing method of a stacked conduit assembly according to claim 5, further comprising, before the stacking step, a heat treatment step of annealing the entirety of the conduit part or the first plate-like part.

* * * * *